(12) United States Patent
Ching et al.

(10) Patent No.: US 6,407,761 B1
(45) Date of Patent: Jun. 18, 2002

(54) SYSTEM AND METHOD FOR THE VISUAL CUSTOMIZATION OF BUSINESS OBJECT INTERFACES

(75) Inventors: Pong Ching, Fremont; Martin Stein, El Granada; Larry Chiang, Mountain View, all of CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 09/309,091

(22) Filed: May 10, 1999

(51) Int. Cl.⁷ .................................................. G06F 3/00
(52) U.S. Cl. ........................................ 345/835; 345/853
(58) Field of Search ................................. 345/700, 744, 345/762–764, 810, 835, 841, 853, 854, 866; 717/1–3, 100, 104–106, 108–110, 113, 120, 121

(56) References Cited

U.S. PATENT DOCUMENTS

| | | | |
|---|---|---|---|
| 5,339,433 A | 8/1994 | Frid-Nielsen | 717/5 |
| 5,487,141 A | 1/1996 | Cain et al. | 345/764 |
| 5,537,630 A | 7/1996 | Berry et al. | 345/763 |
| 5,802,334 A | 9/1998 | Nickolas et al. | 345/854 |

OTHER PUBLICATIONS

International Search Report for appl. PCT/EP 00/03978 dated Apr. 5, 2000.

*Primary Examiner*—Crescelle N dela Torre
(74) *Attorney, Agent, or Firm*—Finnegan, Henderson, Farabow, Garrett and Dunner, L.L.P.

(57) ABSTRACT

A system and method for customizing an interface, or the set of methods, of a business object by pre-defining a number of parameters and fields available to the methods of the business object using a visual customization tool is provided. The interface of the business object consists of the set of methods available to it. The interface is customized such that only the necessary methods, parameters and fields are made available for programming. The set of methods is displayed in a menu-driven format through a graphical user interface. The user selects the method to customize, and the set of parameters available to that method is displayed. Then the user selects the parameters that are intended to be used, and the fields available to those parameters are displayed. The user can preset certain static fields to constant values. After customization, the underlying code of the method is generated automatically and saved.

22 Claims, 11 Drawing Sheets

SYSTEM AND METHOD FOR THE VISUAL CUSTOMIZATION OF BUSINESS OBJECT INTERFACES

FIELD OF THE INVENTION

The present invention is generally related to the field of object-oriented business process development and specifically discloses a system for visually customizing interfaces for business objects to achieve interoperability between disparate computer systems.

BACKGROUND

In the prior art, it is well known to take an object-oriented approach towards developing software systems and programs. Objects have been used to encapsulate blocks of codes in order to provide robust, reusable components for building software programs. In this paradigm, an object has specific state conditions, which are stored as attributes. A "person"-type object, for example, could feature a person's "name", "address" and "fax number"—the object's attributes. Since these attributes are hidden inside the object (the "black box" concept), the user cannot simply access and change them from the outside. In the real world, objects exhibit specific behavior which defines how objects interact. This behavior is implemented as the "methods" of the object. For example, the behavior associated with the example given could be "modify the address" or "change the fax number." Both of these methods access and change the attributes of the "person"—type object. The whole set of methods associated with an object collectively characterize an object's behavior to the outside world; for the purposes of this patent application, this set of methods is called the business object's "interface." In order to access this object or "black box," the user need only have information about the interface and not the inner workings of the object itself.

It has been known in the prior art to apply the object-oriented approach towards developing business processes. Due to the characteristics described above, objects can be used very successfully to describe the business content of applications such as "sales orders," "facilities," and "customers." Large and comprehensive software products can be structured internally by using business objects such that the benefits of object-orientation are introduced into the core information processing of business organizations. This approach allows for component-based technology which provides companies with a reliable means of implementing new functionalities smoothly and quickly. New components can work with existing components in an integrated solution. Such a solution can be easily expanded to take into account user-specific functionality because the interfaces of these components can also be used by specific components created by the user to interface with the existing object-based software system.

By providing an integrated view of the attributes, methods, and events associated with the fundamental building blocks of business, business objects offer a high-level interface for exchanging information among business software systems. This type of implementation will allow users to reuse functionality defined elsewhere for a different purpose. New emerging object standards like COM/DCOM and the CORBA standard of the Object Management Group allow business objects to co-exist in a loosely coupled, multi-platform and multi-standard environment. Business software which attempt to leverage this type of interoperability can achieve seamless integration with countless other software systems implementing these standards.

In the prior art, there are several well-known application interfaces which are used to achieve interoperability between various systems. Business Application Programming Interfaces (BAPI interfaces) from SAP AG of Walldorf, Germany, are well known and widely used forms of interfacing. BAPI interfaces enable customers and third parties to integrate their software components with the Enterprise Resources Planning software offering from SAP AG, the R/3 system. BAPI interfaces are methods of SAP Business Objects.

In the prior art, the methods that belong to each object have been manually defined. A business object interface usually contains multiple methods, each of which has many parameters and fields with their own data types. Programming this type of interface can become quite challenging with the large quantities of parameters and fields. First of all, developers need to remember the names of the many parameters and their data types. Second, although many parameters or table fields can be assigned with constant or default values in most application scenarios, developers still have to manually input these values into the code. Programming these parameters can be very time consuming and susceptible to simple errors in formatting. One of the most common solutions provided in the prior art was to generate code for all the parameters. However, this solution still forced the programmer to remember the parameter and field names and still resulted in a large amount of written code which was unused. Another solution was to build a component that encapsulated the default parameters and their values and thereby present a small, easy-to-program interface. This solution facilitated use by the end users, but the original developer still had to construct the component. Accordingly, what is needed is an interface development tool which does not require preconstruction of components, memorization of parameters, fields, and their associated data types, or the manual programming of constant values into the underlying code.

SUMMARY OF THE INVENTION

The present invention provides a hardware environment enabling a developer to customize the interface to the business object. A smart code generator or a runtime environment is required to support this invention in order to generate the resulting code of the customized methods which comprise the interface. During development of an application program which needs to access the business objects, the user customizes the interfaces of the business objects such that the application program has the necessary and proper access to the business objects. A graphical user interface is provided which displays all of the business objects available to the system in a menu-driven format. The user selects the business object whose interface needs to be customized. Upon this selection, a comprehensive list of methods which are available to the business object is displayed. The user then selects the particular method which needs to be used by the application program under development. Upon selection of the method, a comprehensive list of parameters which are available to that business object are then displayed. The user then selects the parameters which are needed for the application program to interface with the business object. The end goal is to allow the user to select only the methods and parameters which he intends to use in the application program.

The present invention further allows the user to set default or constant field values for parameters which will not change throughout the life of the application program. These constant values should be set for the business object so that the application program does not have to initialize the corresponding parameters and fields.

Upon customization of the interface, the present invention utilizes a back-end system to generate the base code such that the user only has to program the selected parameters and fields. Code generation provides a very specific implementation based on the customization by generating the code underlying each method together with the customization that has occurred. All the default value assignments will be part of the generated implementation, and only the selected parameters will be available for programming. The programming interface can be much smaller since only the relevant code is generated to fulfill the complete implementations.

Therefore, it is an object of the present invention to allow developers to customize the interface visually.

It is a further object of the present invention to automatically generate code from the selected methods and parameters in order to eliminate the manual coding effort.

It is another object of the present invention to provide a menu-driven graphical interface to display all of the business objects, their associated methods, and the parameters associated with each method so that only relevant parameters will be available in the programming environment.

DETAILED DESCRIPTION OF A PREFERRED EMBODIMENT

The following description will focus on a preferred embodiment of the invention which is operative in a single computer system with an attached object repository or object-oriented database system. The present invention, however, is not limited to any particular application or environment. Instead, those skilled in the art will find that the present invention may be advantageously applied to any application or environment where an object needs to be interfaced through the set of methods and parameters that belong to it. The description of the exemplary embodiment which follows is for the purpose of illustration and not limitation.

Figure 1:
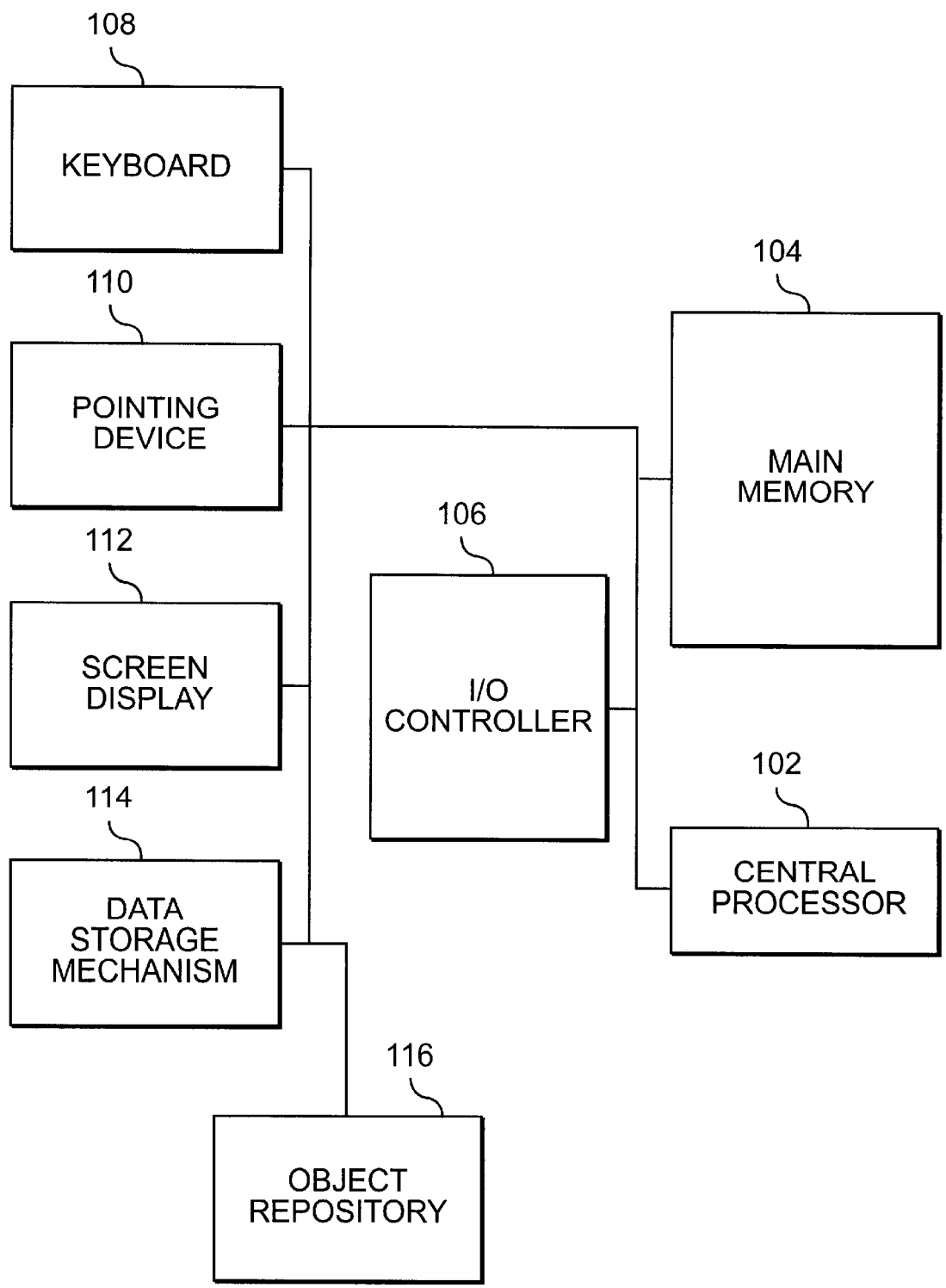
FIG. 1 is a diagram of the computer system in which the present invention may be implemented.

The invention may be embodied on a computer system such as the system of FIG. 1, which comprises central processor 102, main memory 104, input/output controller 106, keyboard 108, pointing device 110, screen display 112, data storage mechanism 114, and object repository 116. Object repository 116 may be any one of a number of commercially available repositories, however, in a preferred embodiment, the Business Object Repository from SAP AG of Walldorf, Germany, is used. Data storage mechanism 114 may be any one of a number of database systems such as Microsoft Access, dbase, Oracle, Sybase, etc.

Figure 2:
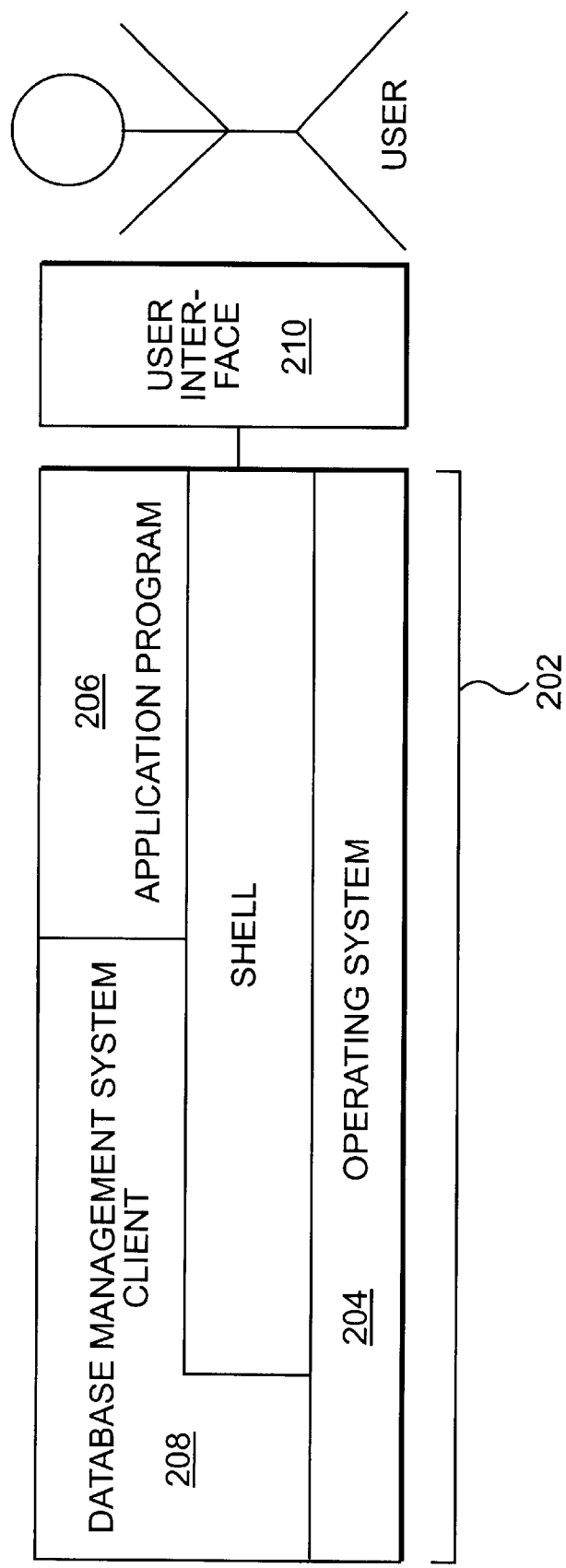
FIG. 2 is a diagram of the software system which directs the operation of the present invention.

Illustrated in FIG. 2, a computer software system is provided for directing the operation of the computer system. The software system, which is stored in system memory 202, and on mass storage or disk memory, includes a kernel or operating system 204, which in this specific embodiment is Windows 95. One or more application programs 206, such as the application software for the present invention, may be loaded (transferred from disk into main memory) for execution by the system. There is a database management system client 208 running in system memory 202. The system also includes user interface 210 for receiving user commands and data as input and displaying result data as output.

The present invention utilizes a monitor or other means of visual display 302 (FIG. 3) for a computer system which permits the user to view the graphical user interface 210. The display of information on the visual display 302 can be changed by the user by selecting the appropriate graphical icons in the user interface 210. While the user may select the graphical icons by keyboard input, or any other means of inputting data into a computer system. In a preferred embodiment of this invention, a mouse pointer device is used. The control and display of a mouse-controlled pointer device is well known, and one skilled in the art of visual displays can readily generate such graphic displays. In one embodiment of the present invention, the user may modify the pictorial representation of the query displayed by clicking-and-dragging the mouse pointer device over the appropriate graphical icon generated and displayed in the user interface.

Figure 3:
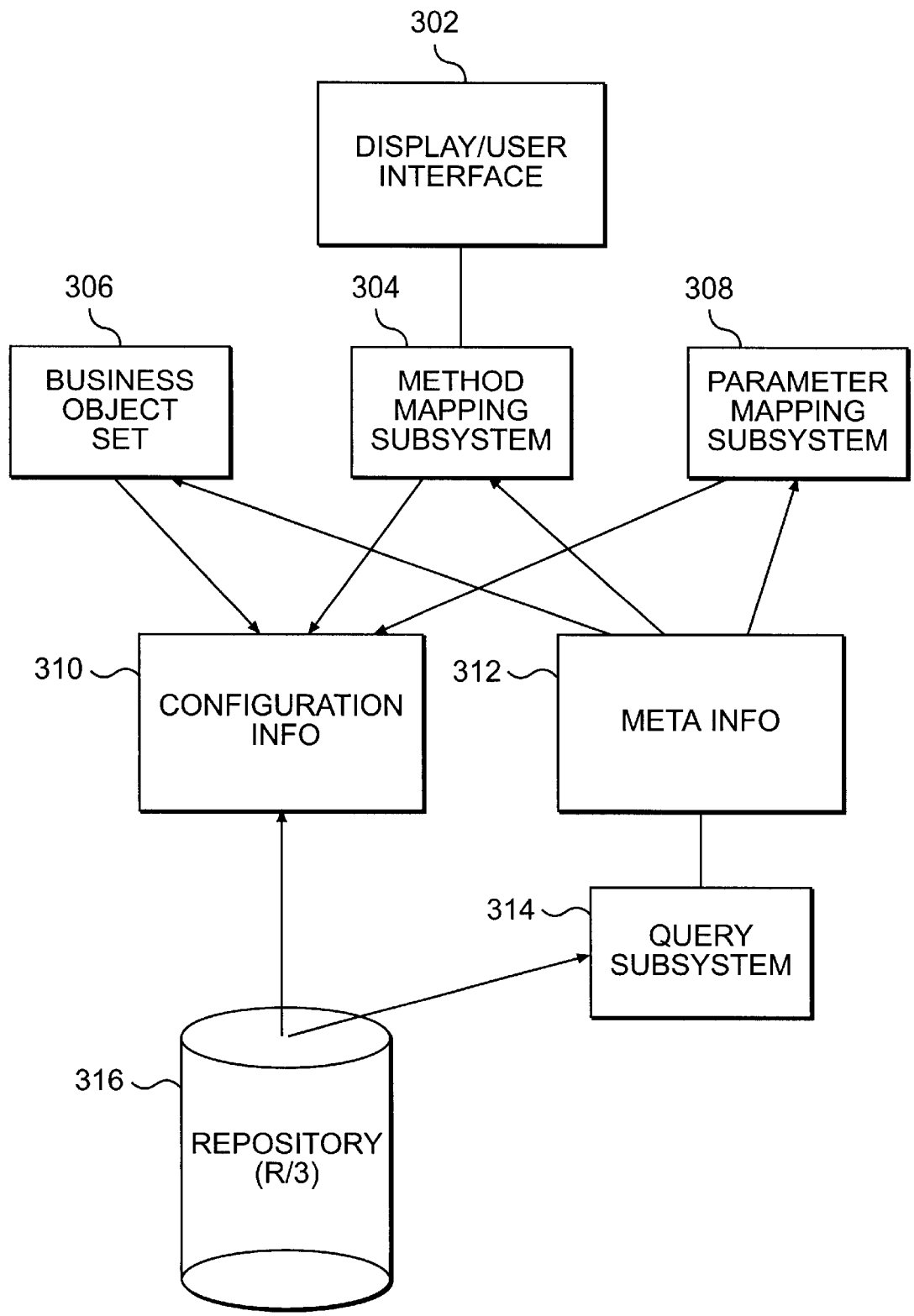
FIG. 3 is a detailed diagram of the present invention.

The system of the present invention is further depicted in FIG. 3. It comprises user interface 302, method mapping subsystem 304 used for mapping the methods which belong to an object into a graphical menu-driven format, and parameter mapping subsystem 308 for mapping the parameters and fields which are available to each method into a graphical menu-driven format, a business object set 306, configuration info 310, metadata info 312 which is information about the object including its hierarchical data structure of available methods, parameters and fields, as well as set of code for each method, a query subsystem 314, and a data repository 316.

Figure 4:
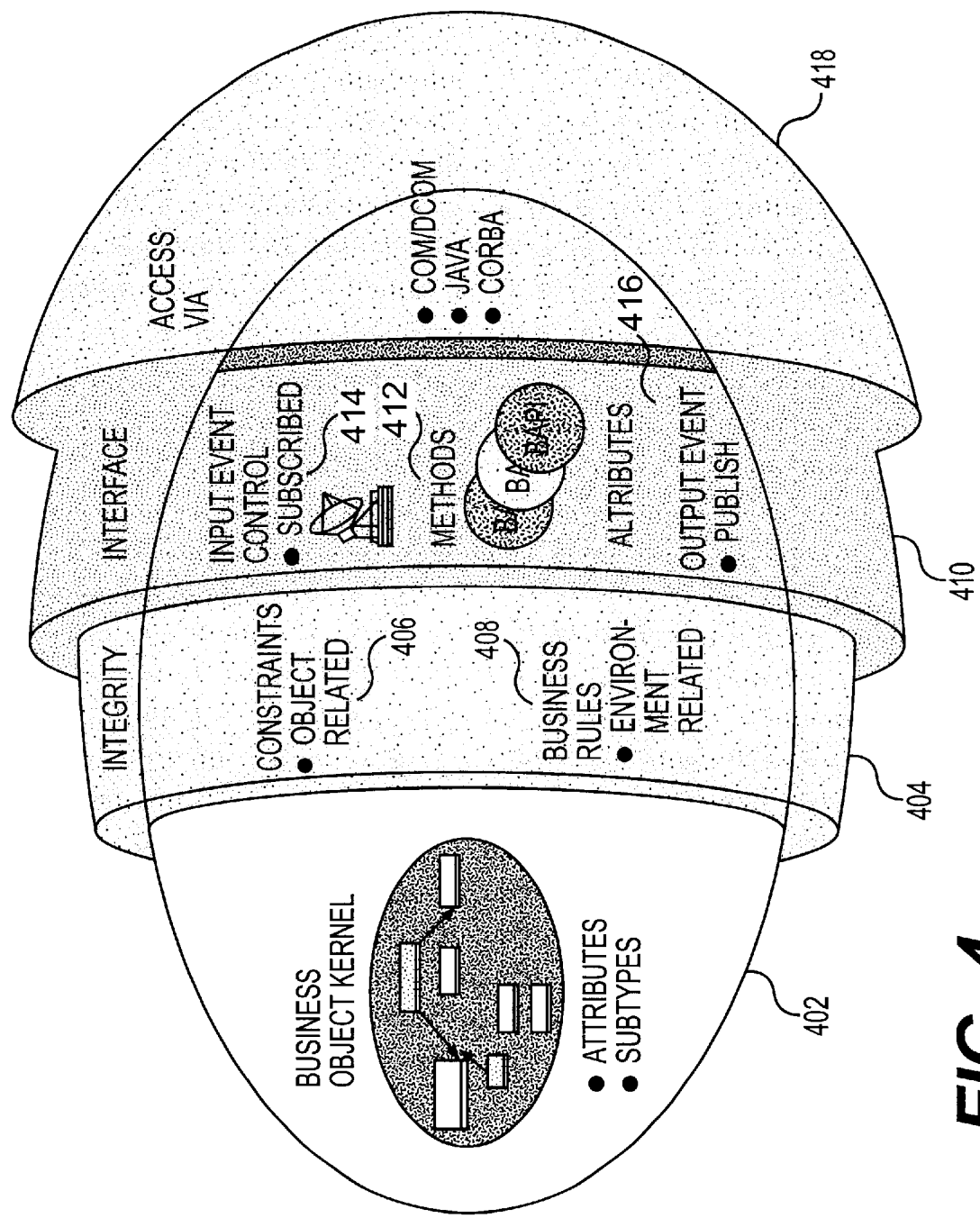
FIG. 4 depicts the structure of the traditional business object.

In a preferred embodiment, the system being used is the SAP R/3 Enterprise Resource Planning system available from SAP AG, Walldorf, Germany. FIG. 4 depicts the structure of the traditional SAP Business Object. The Business Object consists of business object kernel 402 which contains the core business logic. The second layer 404 contains constraints 406 and business rules 408 (responsible for integrity). The third layer 410 contains the methods 412, input event control 414 and output events 416. The final layer 418 is the access layer (COM/DCOM, Java, or CORBA). Business Objects of this embodiment implement standard object-oriented technology such as encapsulation, inheritance, and polymorphism. The third layer 410 is the layer where the customized interface resides.

Business Objects have attributes, which describe the data stored in an object such as "name", "date of employment", and "address" of an employee. Attributes of Business Objects are manipulated by method invocations. The methods of an Business Object are invoked via the runtime component of the Business Object Repository (BOR), which maps requests for method calls to the appropriate Business Object method. Applying the concept of "encapsulation", data may be accessed in an object-oriented way through the object's methods. As mentioned before, BAPI interfaces are specific methods of Business Objects. An example of a BAPI interface in the context of a sales order is "Salesorder.GetStatus," which finds out whether an order has been shipped, for example. The set of methods available for a specific object is called the object's interface.

Figure 5:
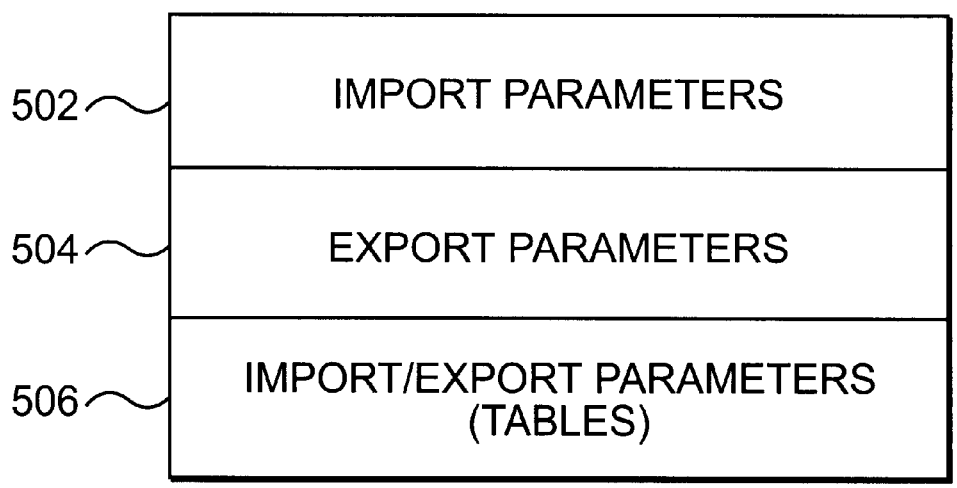
FIG. 5 is a chart of the parameters of the BAPI interface.

The Business Objects held in the BOR encapsulate their data and processes. External access to the data and processes is only possible by means of specific methods, in this embodiment, BAPI interfaces. To use a BAPI interface method, an application program only needs to know how to call the method; that is, it needs to know the method's interface definition. Therefore, when the user includes a BAPI interface invocation in the application program, only the appropriate interface information needs to be supplied. The BAPI interface method's interface as shown in FIG. 5 is defined by import parameters 502, which contain data to be transferred from the calling program to the BAPI interface method, export parameters 504, which contains data to be transferred from the BAPI interface back to the calling program, and import/export (table) parameters 506, for both importing and exporting data.

Figure 6:
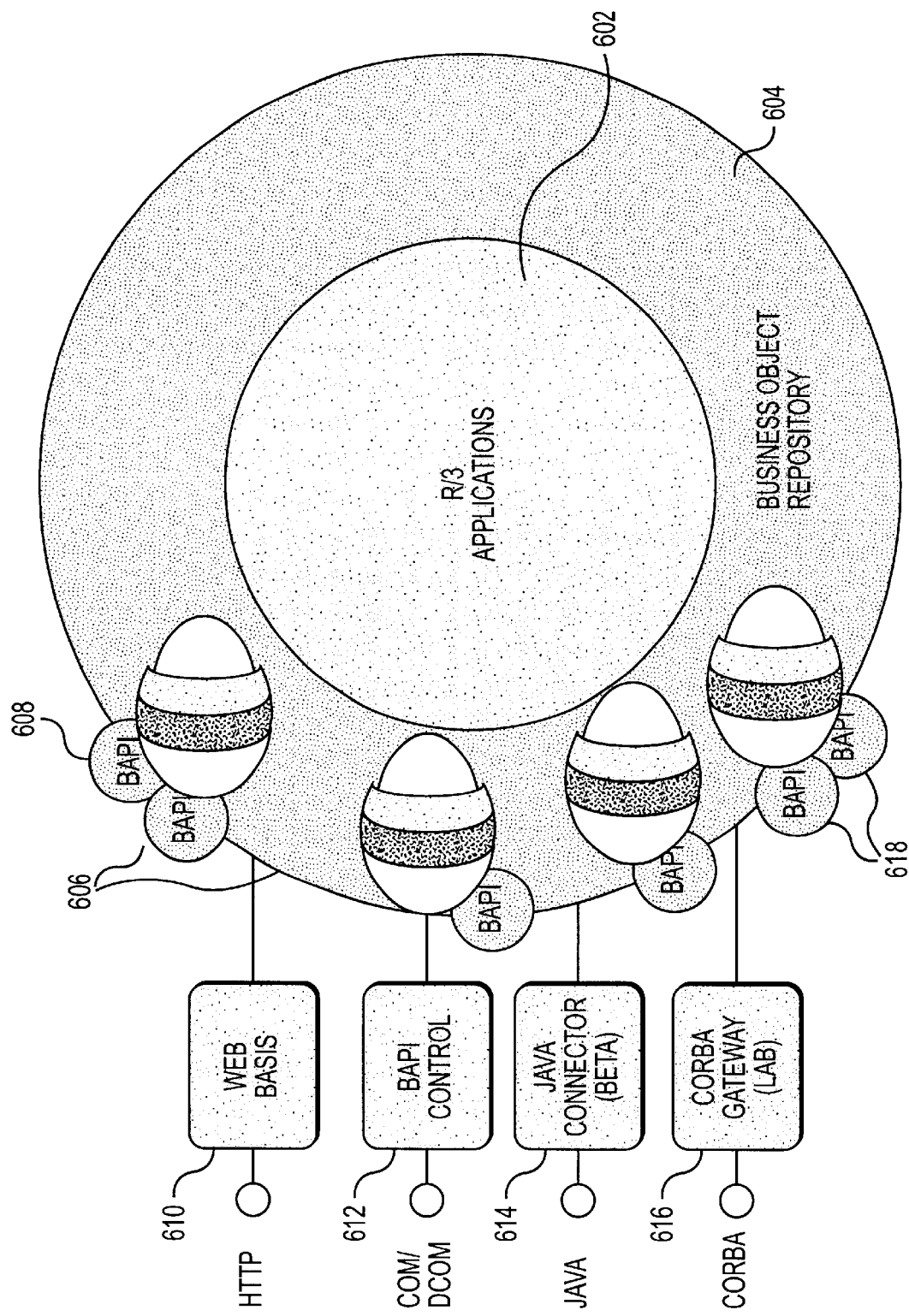
FIG. 6 is a diagram giving an overview of how objects in the ERP system are accessed.

In a preferred embodiment, the objects and associated information are stored in the Business Object Repository (BOR) 604 (FIG. 6). The BOR represents business data, transactions, and events within the ERP system as an integrated set of Business Objects. Business Objects represent robust interfaces to a broad range of processes and data that can be accessed from the Business Object Repository. Business Objects include business-oriented concepts like "customer," "material," "order," "quotation," and "request for quotation." SAP users can define their own business-related object types in the BOR in order to encapsulate objects from their own systems.

The registration of objects is performed via the definition of object types in the BOR. At runtime, objects are also accessed by the clients through the BOR, which passes on the request to the object and reports results back to the client. In this way, the coding and location of the object remains hidden from the user.

FIG. 6 is a diagram giving an overview of how objects in the ERP system are accessed. At the nucleus of the system of the preferred embodiment is R/3 Applications group 602. Around this nucleus is the Business Object Repository 604, which contains multiple objects 606. In interface layer 608 of the Business Object is a method, in this case, a BAPI interface 618. This BAPI interface 618 allows transfer of information from the various gateways into the ERP system such as Web Basis 610, BAPI Control 612 for COM/DCOM, Java Connector 614, and CORBA Gateway 616.

These BAPI interfaces 618 enable external access to the business processes and Business Objects. The BAPI interfaces define an open business standard for direct communication between business applications from different suppliers. In a preferred embodiment, the customization of the business object interfaces will be focused on the creation of BAPI interfaces. Note that BAPI interfaces are methods of business objects and thereby are the target in this embodiment of the present invention.

Figure 7:
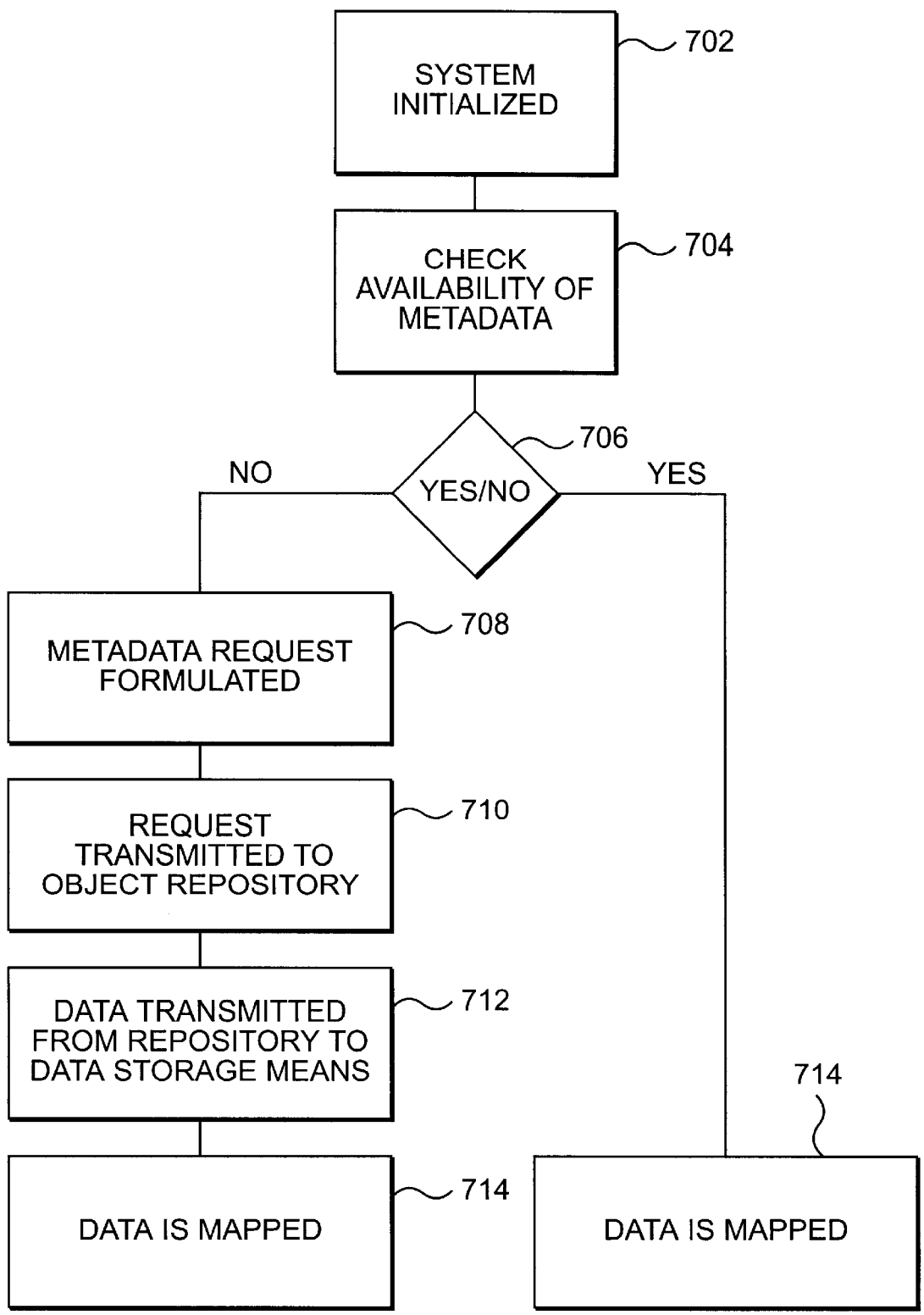
FIG. 7 is a flowchart depicting the mapping of business object information from the repository into the menu-driven format of the present invention.
Figure 8:
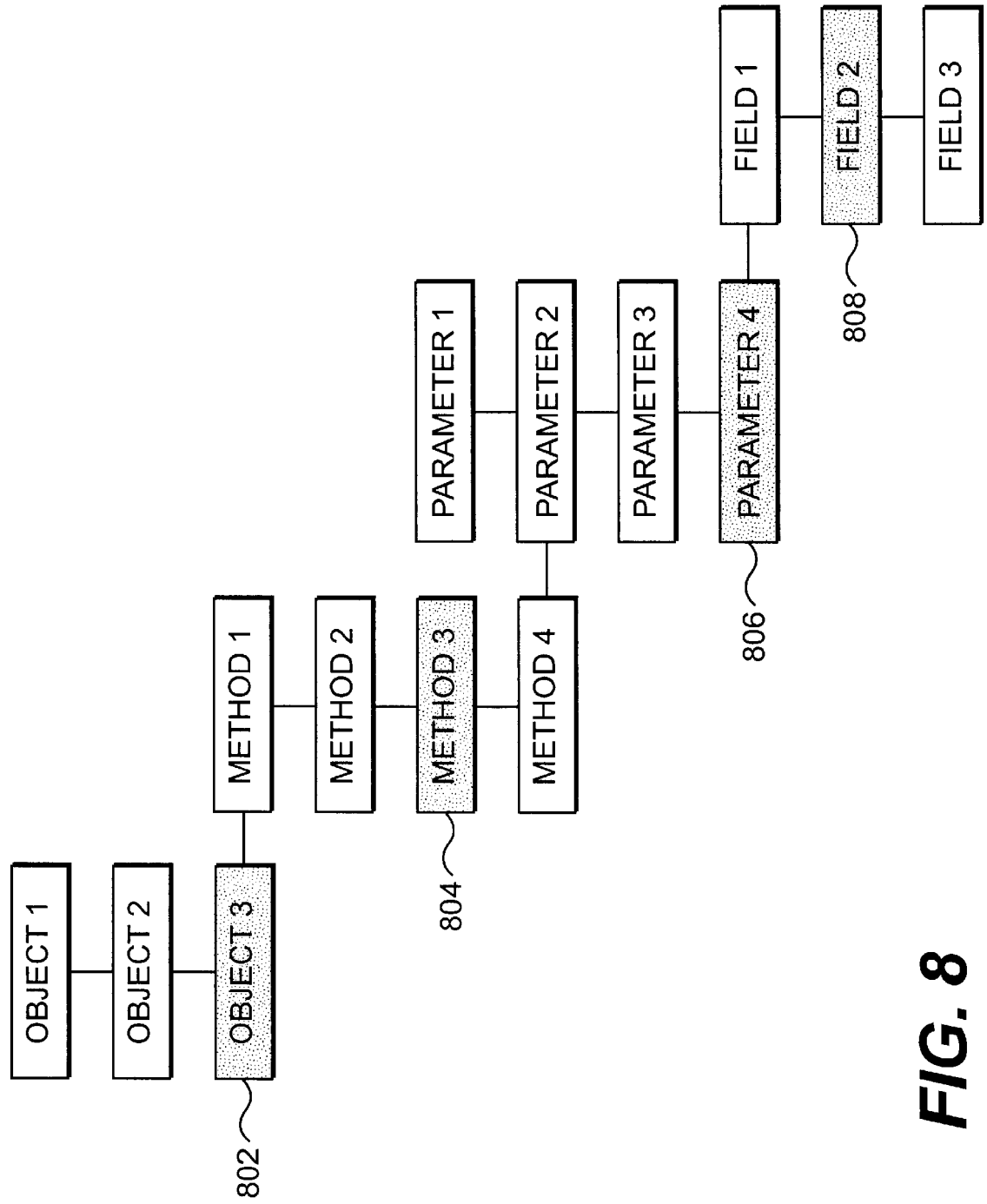
FIG. 8 depicts the hierarchical structure of the business object's metadata.

Business objects are stored in a repository, for example by writing to a medium such as a magnetic disk. In this embodiment the Business Object Repository (BOR) 604. FIG. 7 is a flowchart depicting the mapping of business object information from the repository into the menu-driven format of the present invention. There is a communication means, such as a serial bus, between the BOR 604 and the system of the present invention which allows transfer of data between the two. The metadata of the business objects to be configured must be obtained by the system of the present invention. Upon initialization 702 of the system, the system checks 704 to see if the metadata is available locally. If resulting decision 706 is no, a request for the metadata is formulated 708 and transmitted 710 to the object repository. Upon receipt of this request, the data is transferred 712 from the repository to the data storage mechanism of the customization system where it is mapped 714. In an alternate embodiment, the metadata is stored on the system where the system of the present invention resides to reduce the time necessary to transfer the data between the BOR 604 and the system. The metadata of the business object is stored in a hierarchical data structure as depicted in FIG. 8. Each object 802 has one or more methods 804, and each method has one or more parameters 806, and each parameter has one or more fields 808. The hierarchical data structure stored in the data storage mechanism is then mapped into the menu-driven graphical user interface. The format in a preferred embodiment is based on the format used in the Windows file structure display system.

Figure 9:
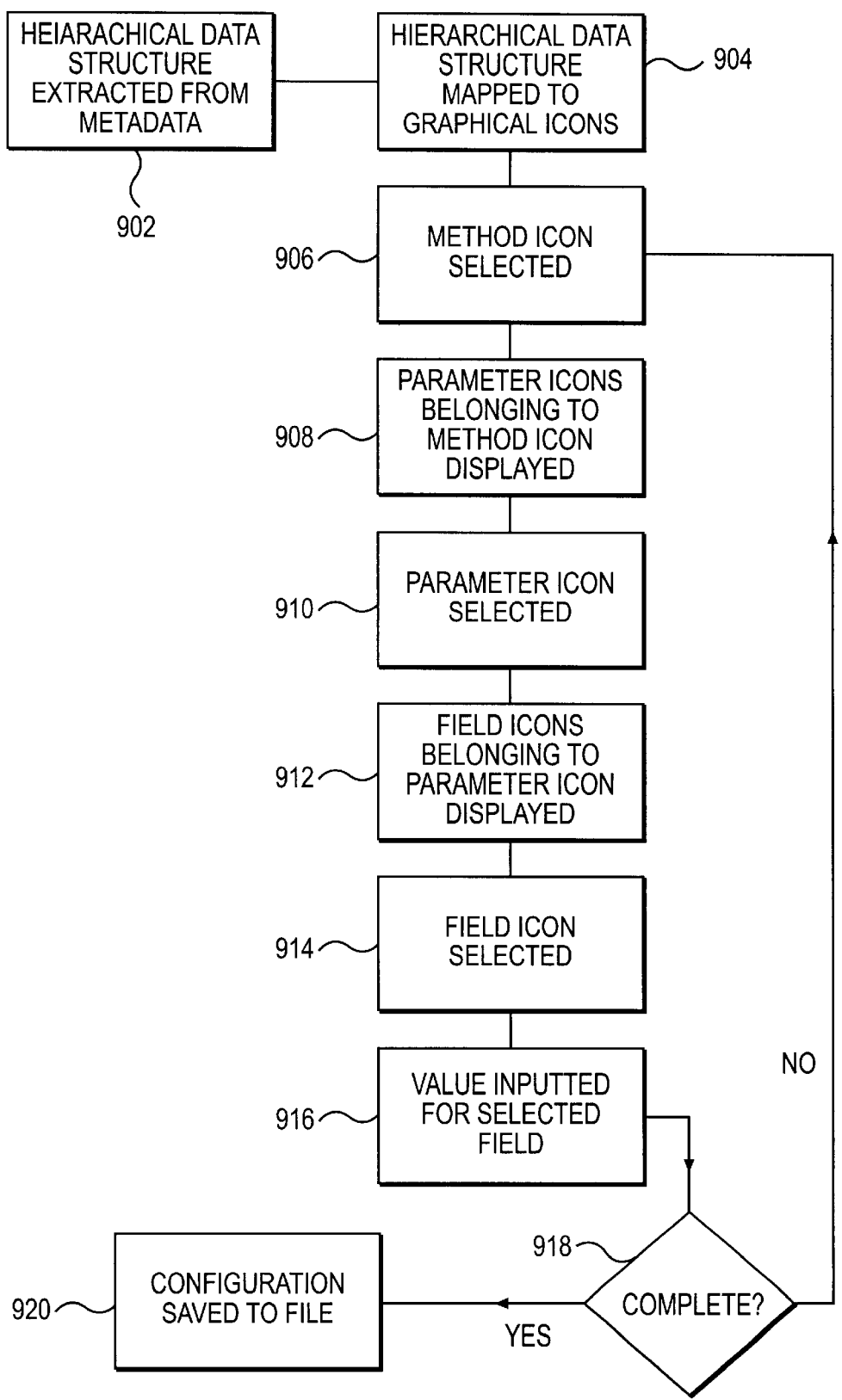
FIG. 9 is a flowchart depicting the overall operation of the present invention.

FIG. 9 is a flowchart depicting the overall operation of the invention. First, the hierarchical data structure is extracted 902 from the metadata which can be done by searching through the metadata for the appropriate information. It is then mapped 904 to the graphical icons. The graphical icons are generated by a graphic generator which creates the image on a visual display, through which the graphical icons are provided to the user. Then, the user selects 906 the graphical icon of the particular method which he wants to customize. All the graphical icons representing the parameters which are available to that method icon are then displayed 908. The user then selects 910 the graphical icon of the particular parameter which he wants to customize. Likewise, all the graphical icons representing the fields which are available to that parameter are then displayed 912. The user then selects 914 the graphical icon of the particular field for which a value is to be defined and inputs 916 the value for that field. Depending on whether the customization is complete 918, the user can then begin the process again until all customization of the various methods has been completed, at which point, a configuration is saved 918 to file.

Figure 10:
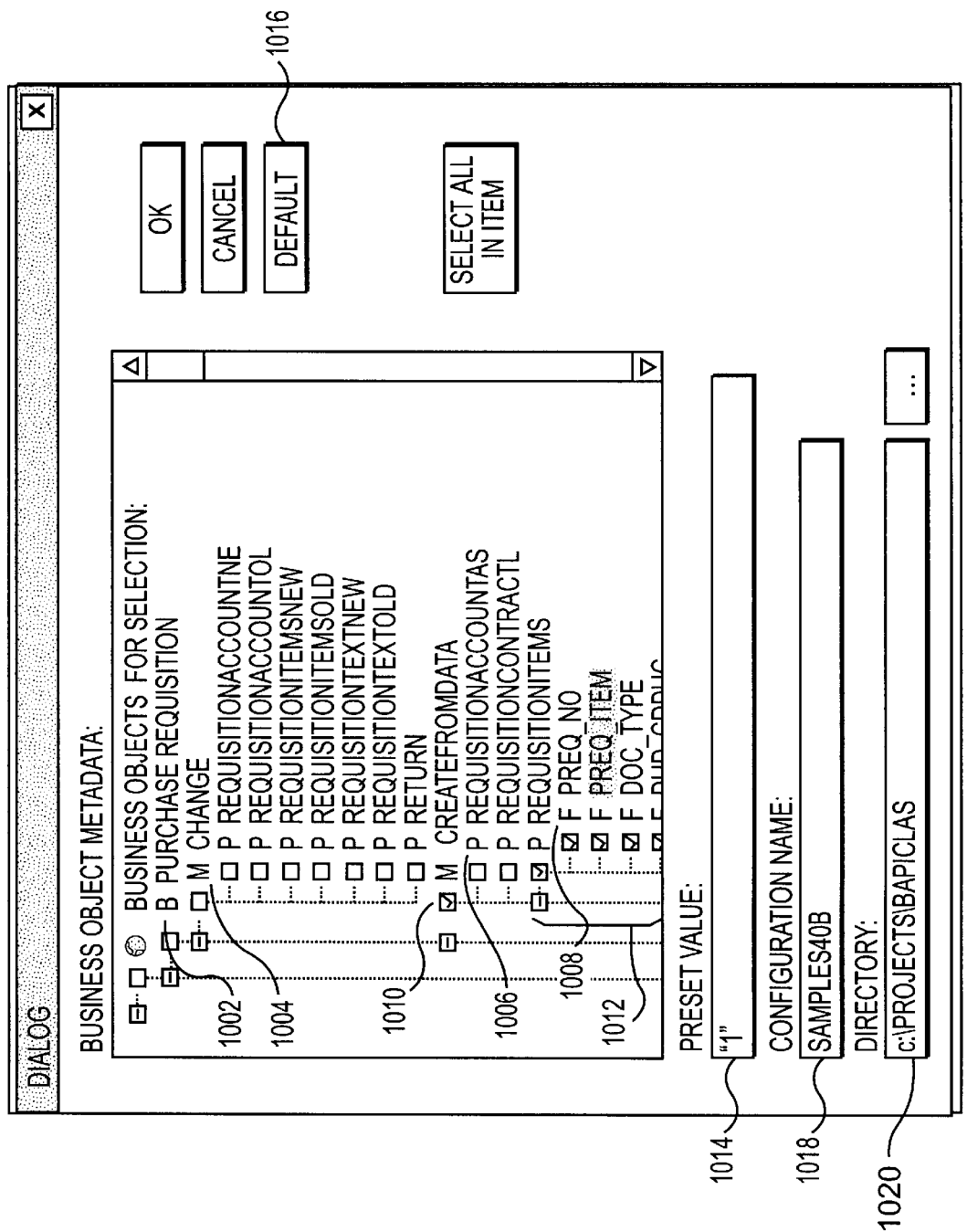
FIG. 10 depicts a graphical user interface of the present invention.

FIG. 10 depicts the graphical user interface of a preferred embodiment. It details the various components that can be modified through the customization tool. Item 1002 with an upper-case B character next to the name text of the item is an example of a business object. Item 1004 with an upper-case M character next to the name text of the item is an example of a method. Item 1006 with an upper-case P character next to the name text of the item is an example of a parameter. Item 1008 with an upper-case F character next to the name text of the item is a field. The items are nested in the hierarchical data structure such that each item contains branches where each branch represents a subsidiary item that belongs to it. To open a branch of the hierarchy tree, the user clicks on the item whose branches need to be displayed. To close the same branch of the hierarchy tree, the user clicks again on the same item. The items that are allowed to be selected in this embodiment are the method, parameter, and field items. To select an item, the user places the cursor in the small square checkbox 1010 beside the name text of the desired item and clicks the mouse button. To de-select an item, the user places the cursor in the square checkbox beside the name text of the desired item. Note that when an item is de-selected, all items in its branch are de-selected automatically because each item in the branch cannot be selected unless its owner is selected 1012.

Some import parameters are mandatory, according to their definitions in the business object repository. These parameters cannot be de-selected by the user. This information is passed along with the metadata of the business object. The system identifies the parameters which are mandatory and ensures that they cannot be de-selected. To customize an item, the user highlights it by placing the cursor on the name text of the desired item and clicking the mouse. A text edit box 1014 appears with the label "preset value." The user defines the field by inputting the constant text value of the field into this box. It is important to note that the text of the constant text value must conform to the system by which it is to be processed or compiled. For instance, if the generated code is to be compiled by C+,+ compiler, and double quotes ("") are needed to be syntactically correct, then the user must put the double quotes into the preset value in the text edit box 1014 so the generated code compiles successfully.

The system also provides for default generation, which is defined as code generation using all methods, all parameters, and all fields with no preset values for any of parameters or fields. The result of the generation is all the code underlying the method. For "default generation," the user simply clicks on the button with the label "default." 1016 This selects all of the branches of the hierarchical tree.

After completing the process of selecting and entering preset values for the parameters and fields, the use commits the configuration. To commit the configuration, the user must enter a configuration name into the text edit box 1018 labeled "configuration name." Then, the user must enter the directory 1020 in which the configuration file would be stored. If no directory is given, then the local directory is used as the storage directory. After entering a configuration name and a directory for storage of the configuration file, the user press the button with label "OK" to commit the configuration and start generation.

Figure 11:
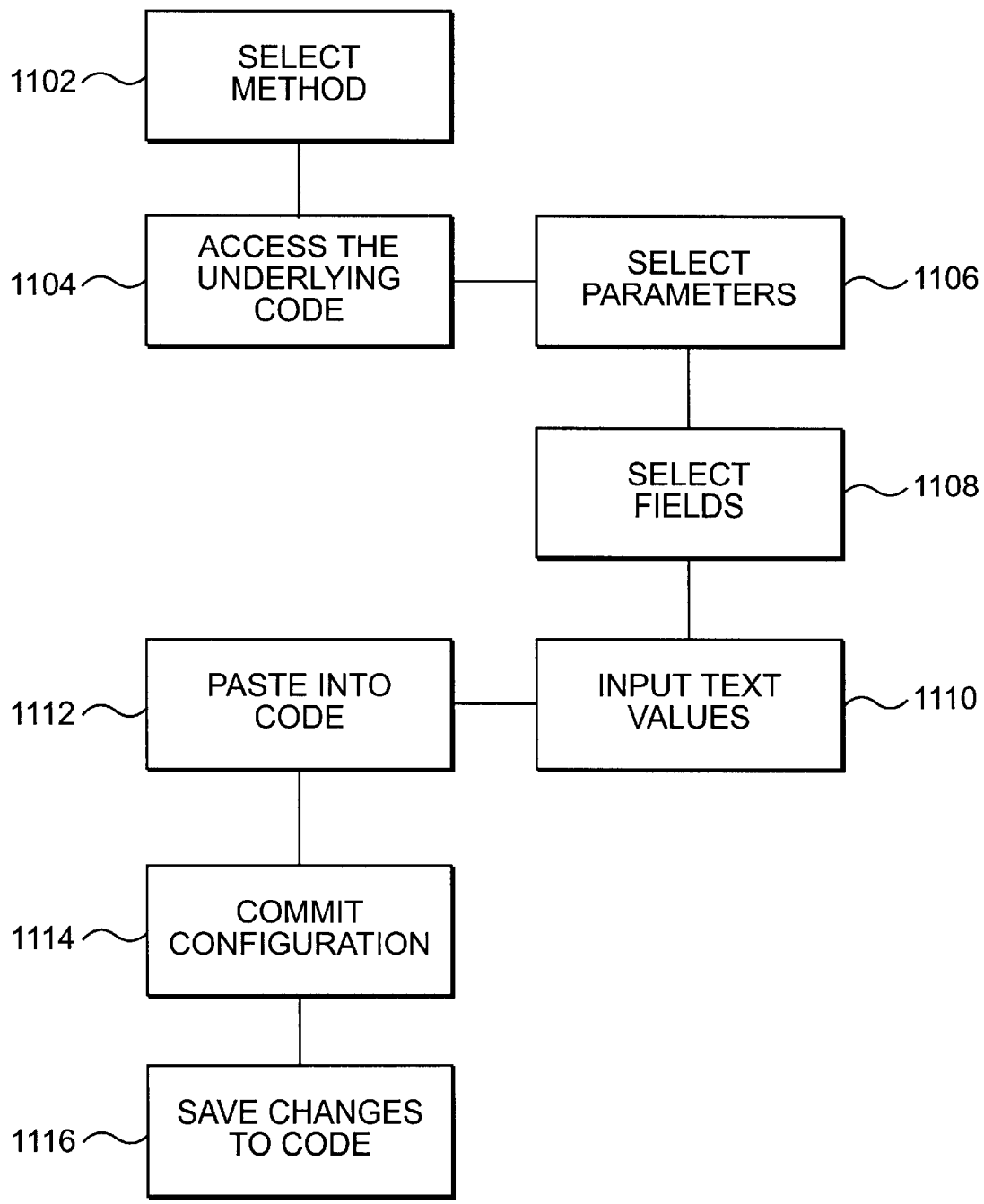
FIG. 11 is flowchart depicting a flowchart of the steps that take place in generating the code that corresponds to the customized method.

Each method which appears in the graphical user interface has associated code which is stored in the data storage mechanism. The parameters which are associated with each method correspond to values which must be inputted into the code in order to be executable. FIG. 11 depicts a flowchart of the steps that take place in generating the code that corresponds to the customized method. When the user selects 1102 a particular method, the parameters and fields within the underlying code of that method are displayed in the graphical user interface. When a method is selected, a subset of the set of code of the business object is made available 1104 in the RAM of the system. Then the parameters 1106 and the fields 1108 are selected by the user. Any information inputted 1110 into the text fields of the parameters and fields as described is inputted 1112 into the underlying code of the selected method so that the developer does not have to manually edit the code. When the configuration is committed 1114, the information inputted 1110 into the underlying code of the selected method is saved 1116 in a directory. Once the configuration is committed, it can be accessed by the user to program the interface in a manner which is much simpler and efficient because the amount of manual programming is now much more limited as a result of the customization.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A system for visually customizing methods of a business object by creating a configuration comprising:

means for providing a plurality of graphical icons representing a plurality of methods belonging to said business object;

means for selecting one of said plurality of graphical icons representing one of said plurality of methods;

means for providing a plurality of graphical icons representing a plurality of parameters belonging to said one of said plurality of methods;

means for selecting one of said plurality of graphical icons representing one of said plurality of parameters;

means for providing a plurality of graphical icons representing a plurality of fields belonging to said one of said plurality of parameters;

means for selecting one of said plurality of graphical icons representing one of said plurality of fields;

means for inputting a constant text value for said one of said plurality of graphical icons representing one of said plurality of fields; and means for saving said configuration based on said selecting of one of said plurality of graphical icons representing one of said plurality of methods belonging to said business object, said selecting of one of said plurality of graphical icons representing one of said plurality of parameters belonging to said one of said plurality of methods, and said selecting of one of said plurality of fields belonging to said one of said plurality of parameters.

2. The system of claim 1 further comprising:

means for storing said business object and a set of associated metadata in a business object repository; and means for transferring said set of associated metadata from said business object repository to a data storage mechanism.

3. The system of claim 2 wherein said metadata comprises a hierarchical structure representing said plurality of methods belonging to said business object, said plurality of parameters belonging said one of said plurality of methods, and said plurality of fields belonging to said one of said plurality of parameters.

4. The system of claim 3 wherein said metadata further comprises a set of code for each one of said plurality of methods.

5. The system of claim 4 further comprising:

means for extracting said hierarchical structure from said metadata;

means for mapping said hierarchical structure into a menu-driven graphical interface; and means for generating said plurality of graphical icons representing a plurality of methods which belong to said business object, said plurality of graphical icons representing a plurality of parameters belonging to said one of said plurality of methods, and said plurality of graphical icons representing a plurality of fields belonging to said one of said plurality of methods, based on said mapping of said hierarchical structure.

6. The system of claim 4 further comprising:

means for providing a subset of said set of code for said each one of said plurality of methods based on said selecting of one of said plurality of parameters, said selecting of one of said plurality of fields, and said inputting of said constant text value for said one of said plurality of fields.

7. The system of claim 2 wherein a copy of said business object and a copy of said set of associated metadata are stored in said database storage mechanism.

8. A method for visually customizing methods of a business object by creating a configuration comprising the steps of:

providing a plurality of graphical icons representing a plurality of methods belonging to said business object;

selecting one of said plurality of graphical icons representing one of said plurality of methods;

providing a plurality of graphical icons representing a plurality of parameters belonging to said one of said plurality of methods;

selecting one of said plurality of graphical icons representing one of said plurality of parameters;

providing a plurality of graphical icons representing a plurality of fields belonging to said one of said plurality of parameters;

selecting one of said plurality of graphical icons representing one of said plurality of fields;

inputting a constant text value for said one of said plurality of graphical icons representing one of said plurality of fields; and saving said configuration based on said selecting of one of said plurality of graphical icons representing one of said plurality of methods belonging to said business object, said selecting of one of said plurality of graphical icons representing one of said plurality of parameters belonging to said one of said plurality of methods, and said selecting of one of said plurality of fields belonging to said one of said plurality of parameters.

9. The method of claim 8 further comprising the steps of:

storing said business object and a set of associated metadata in a business object repository; and transferring said set of associated metadata from said business object repository to a data storage mechanism.

10. The method of claim 9 wherein said metadata comprises a hierarchical structure representing said plurality of methods belonging to said business object, said plurality of parameters belonging to said one of said plurality of methods, and said plurality of fields belonging to said one of said plurality of parameters.

11. The method of claim 10 wherein said metadata further comprises a set of code for each one of said plurality of methods.

12. The method of claim 11 further comprising the steps of:

extracting said hierarchical structure from said metadata;

mapping said hierarchical structure into a menu-driven graphical interface; and generating said plurality of graphical icons representing a plurality of methods belonging to said business object, said plurality of graphical icons representing a plurality of parameters belonging to said one of said plurality of methods, and said plurality of graphical icons representing a plurality of fields belonging to said one of said plurality of methods, based on said mapping of said hierarchical structure.

13. The method of claim 11 further comprising the step of:

providing a subset of said set of code for said each one of said plurality of methods based on said selecting of one of said plurality of parameters, said selecting of one of said plurality of fields, and said inputting of said constant text value for said one of said plurality of fields.

14. The method of claim 9 wherein a copy of said business object and a copy of said set of associated metadata are stored in said database storage mechanism.

15. A computer-readable medium having stored thereupon a plurality of instructions, said plurality of instructions including instructions which, when executed by a processor, cause the processor to perform the steps of:

providing a plurality of graphical icons representing a plurality of methods belonging to said business object;

selecting one of said plurality of graphical icons representing one of said plurality of methods;

providing a plurality of graphical icons representing a plurality of parameters belonging to said one of said plurality of methods;

selecting one of said plurality of graphical icons representing one of said plurality of parameters;

providing a plurality of graphical icons representing a plurality of fields belonging to said one of said plurality of parameters;

selecting one of said plurality of graphical icons representing one of said plurality of fields;

inputting a constant text value for said one of said plurality of graphical icons representing one of said plurality of fields; and saving a configuration based on said selecting of one of said plurality of graphical icons representing one of said plurality of methods belonging to said business object, said selecting of one of said plurality of graphical icons representing one of said plurality of parameters belonging to said one of said plurality of methods, and said selecting of one of said plurality of fields belonging to said one of said plurality of parameters.

16. The computer-readable medium of claim 15 wherein said instructions, when executed by said processor, cause said processor to perform the further steps of:

storing said business object and a set of associated metadata in a business object repository; and transferring said set of associated metadata from said business object repository to a data storage mechanism.

17. The computer-readable medium of claim 16 wherein said metadata comprises a hierarchical structure representing said plurality of methods belonging to said business object, said plurality of parameters belonging to said one of said plurality of methods, and said plurality of fields belonging to said one of said plurality of parameters.

18. The computer-readable medium of claim 17 wherein said metadata further comprises a set of code for each one of said plurality of methods.

19. The computer-readable medium of claim 18 wherein said instructions, when executed by said processor, cause said processor to perform the further the steps of:

extracting said hierarchical structure from said metadata;

mapping said hierarchical structure into a menu-driven graphical interface; and generating said plurality of graphical icons representing a plurality of methods belonging to said business object, said plurality of graphical icons representing a plurality of parameters belonging to said one of said plurality of methods, and said plurality of graphical icons representing a plurality of fields belonging to said one of said plurality of methods, based on said mapping of said hierarchical structure.

20. The computer-readable medium of claim 18 wherein said instructions, when executed by said processor, cause said processor to perform the further the step of:

providing a subset of said set of code for said each one of said plurality of methods based on said selecting of one of said plurality of parameters, said selecting of one of said plurality of fields, and said inputting of said constant text value for said one of said plurality of fields.

21. The computer-readable medium of claim 16 wherein a copy of said business object and a copy of said set of associated metadata are stored in said database storage mechanism.

22. A system for visually customizing methods of a business object by creating a configuration comprising:

a user interface for providing a plurality of graphical icons representing a plurality of methods belonging to said business object;

a user interface for selecting one of said plurality of graphical icons representing one of said plurality of methods;

a user interface for providing a plurality of graphical icons representing a plurality of parameters belonging to said one of said plurality of methods;

a user interface for selecting one of said plurality of graphical icons representing one of said plurality of parameters;

a user interface for providing a plurality of graphical icons representing a plurality of fields belonging to said one of said plurality of parameters;

a user interface for selecting one of said plurality of graphical icons representing one of said plurality of fields;

a user interface for inputting a constant text value for said one of said plurality of graphical icons representing one of said plurality of fields; and a subsystem for saving said configuration based on said selecting of one of said plurality of graphical icons representing one of said plurality of methods belonging to said business object, said selecting of one of said plurality of graphical icons representing one of said plurality of parameters belonging to said one of said plurality of methods, and said selecting of one of said plurality of fields belonging to said one of said plurality of parameters.

* * * * *